United States Patent [19]

Tam

[11] Patent Number: 5,270,926
[45] Date of Patent: Dec. 14, 1993

[54] METHOD AND APPARATUS FOR RECONSTRUCTING A THREE-DIMENSIONAL COMPUTERIZED TOMOGRAPHY (CT) IMAGE OF AN OBJECT FROM INCOMPLETE CONE BEAM PROJECTION DATA

[75] Inventor: Kwok C. Tam, Schenectady, N.Y.

[73] Assignee: General Electric Company, Schenectady, N.Y.

[21] Appl. No.: 631,514

[22] Filed: Dec. 21, 1990

[51] Int. Cl.$^5$ ............................................. G06F 15/42
[52] U.S. Cl. ........................... 364/413.19; 364/413.14
[58] Field of Search ....................... 364/413.13, 413.14, 364/413.15, 413.16, 413.18, 413.19, 413.22; 382/6; 378/901; 395/127

[56] References Cited

U.S. PATENT DOCUMENTS

| | | | |
|---|---|---|---|
| 4,375,696 | 3/1983 | Wagner | 378/20 |
| 4,888,693 | 12/1989 | Tam | 364/413.16 |
| 4,920,491 | 4/1990 | Eberhard et al. | 364/413.19 |
| 4,969,110 | 11/1990 | Little et al. | 364/550 |
| 5,053,958 | 10/1991 | Tam | 364/413.13 |
| 5,068,882 | 11/1991 | Eberhard | 378/4 |
| 5,073,910 | 12/1991 | Eberhard et al. | 378/4 |

OTHER PUBLICATIONS

*J. Opt. Soc. Am.*, vol. 73, No. 11, Nov. 1983, Medoff et al., "Iterative Convolution Back-projection ...", pp. 1493-1500.
*J. Opt. Soc. Am.*, vol. 1, No. 6, Jun. 1984, Feldkamp et al., "Practical cone-beam algorithm", pp. 612-619.
Systems and Computers in Japan, vol. 21, No. 11, 1990, Kudo et al., "Three-Dimensional Tomographic Image Reconstruction ...", pp. 86-95.
"Tomographical Imaging with Limited Angle Input", K. C. Tam et al., J. Opt. Soc. Am., vol. 71, No. 5, pp. 582-592 (May 1981).
"Convolutional Reconstruction from Cone-Beam Projection Data", G. N. Minerbo, IEEE Trans. Nucl. Sci., vol. NS-26, No. 2, pp. 2682-2684 (Apr. 1979).
"An Inversion Formula for Cone-Beam Reconstruction", H. K. Tuy, SIAM J. Math., vol. 43, No. 3, pp. 546-552 Jun. 1983).
"Image Reconstruction from Cone-Beam Projections: Necessary and Sufficient Conditions and Reconstruction Methods", B. D. Smith, IEEE Trans. Med. Imag., vol. MI-44, pp. 14-25 (Mar. 1985).

*Primary Examiner*—Donald E. McElheny, Jr.
*Assistant Examiner*—David Huntley
*Attorney, Agent, or Firm*—Paul R. Webb, II

[57] ABSTRACT

A method and apparatus are disclosed for reconstructing a 3D CT image of an object from incomplete x-ray cone beam projection data, additionally employing object boundary information from a separate optical scan. A 3D image of the object is reconstructed slice-by-slice by employing, for each slice, a 2D reconstruction procedure for example, filtered backprojection, on the values of the 2D projection images in the plane of the slice to calculate a 2D image of the object for each of the slices.

8 Claims, 10 Drawing Sheets

FIG. 1
PRIOR ART

CONE BEAM
DETECTOR DATA $X(\theta) = \int f(r,\theta,z_0)dr$

FIG. 2b

DETECTOR
INTEGRALS $\int X(\theta)d\theta = \iint f(r,\theta,z_0)drd\theta$

FIG. 2c

PART $f(x,y,z)$

FIG. 2a

RADON TRANSFORM $\iint f(r,\theta,z_0)drd\theta$

FIG. 2d

PARALLEL BEAM
DETECTOR DATA $\hat{X}(\theta) = \int f(x,y,z)ds$

FIG. 2e

3D CT IMAGE $\hat{f}(x,y,z)$

METHOD AND APPARATUS FOR RECONSTRUCTING A THREE-DIMENSIONAL COMPUTERIZED TOMOGRAPHY (CT) IMAGE OF AN OBJECT FROM INCOMPLETE CONE BEAM PROJECTION DATA

CROSS-REFERENCE TO RELATED APPLICATIONS

The invention disclosed and claimed herein is related to the subject matter Of the following commonly-assigned patent applications, the entire disclosures of which are hereby expressly incorporated herein by reference:

Ser. No. 07/631,815, filed Dec. 21, 1990, concurrently herewith, by Kwok C. Tam, entitled "METHOD AND APPARATUS FOR CONVERTING CONE BEAM X-RAY PROJECTION DATA TO PLANAR INTEGRALS AND RECONSTRUCTING A THREE-DIMENSIONAL COMPUTERIZED TOMOGRAPHY (CT) IMAGE OF AN OBJECT;" and Ser. No. 07/631,818, filed Dec. 21, 1990, concurrently herewith, by Kwok C. Tam, entitled "PARALLEL PROCESSING METHOD AND APPARATUS FOR RECONSTRUCTING A THREE-DIMENSION COMPUTERIZED TOMOGRAPHY (CT) IMAGE OF AN OBJECT FROM CONE BEAM PROJECTION DATA OR FROM PLANAR INTEGRALS."

BACKGROUND OF THE INVENTION

The present invention relates generally to three-dimensional (3D) computerized tomography (CT) and, more particularly, to methods and apparatus for reconstructing a 3D object image from incomplete x-ray cone beam projection data.

In conventional computerized tomography for both medical and industrial application, an x-ray fan beam and a linear array detector are employed. Two-dimensional (2D) imaging is achieved. While the data set is complete and image quality is correspondingly high, only a single slice of an object is imaged at a time. When a 3D image is required, a "stack Of slices" approach is employed Acquiring a 3D data set a 2D slice at a time is inherently tedious and time-consuming. Moreover, in medical applications, motion artifacts occur because adjacent slices are not imaged Simultaneously. Also, dose utilization is less than optimal, because the distance between slices is typically less than the x-ray collimator aperture, resulting in double exposure to many parts of the body.

A more recent approach, based on what is called cone beam geometry, employs a two-dimensional array detector instead of a linear array detector, and a cone beam x-ray source instead of a fan beam X-ray source. At any instant the entire object is irradiated by a cone beam x-ray source, and therefore cone beam scanning is much faster than slice-by-slice scanning using a fan beam or a parallel beam. Also, since each "point" in the object is viewed by the x-rays in 3D rather than in 2D much higher contrast can be achieved than is possible with conventional 2D x-ray CT. To acquire cone beam projection data, an object is scanned, preferably over a 360° angular range, either by moving the x-ray source in an appropriate scanning trajectory, for example, a circular trajectory around the object, while keeping the 2D array detector fixed with reference to the source, or by rotating the object while the source and detector remain stationary. In either case, it is relative movement between the source and object which effects scanning.

However, image reconstruction procedures in x-ray CT are based on the Radon inversion process, in which the image of an object is reconstructed from the totality of the Radon transform of the object. The Radon transform of a 2D object consists of integrals of the object density on lines intersecting the object. The Radon transform of a 3D object consists of planar integrals. Image reconstruction by inversion from cone beam scanning data generally comprises two steps: (1) convert the cone beam data to planar integrals in Radon space, and (2) perform an inverse Radon transform on the planar integrals to obtain the image.

The cone beam geometry for 3D imaging has been discussed extensively in the literature, as represented by the following: Gerald N. Minerbo, "Convolutional Reconstruction from Cone-Beam Projection Data," IEEE Trans. Nucl. Sci., Vol. NS-26, No. 2, pp. 2682–2684 (Apr. 1979); Heang K. Tuy, "An Inversion Formula for Cone-Beam Reconstruction," SIAM J. Math., vol. 43, No. 3, pp. 546–552 (Jun. 1983) and Bruce D. Smith, "Image Reconstruction from Cone-Beam Projections: Necessary and Sufficient Conditions and Reconstruction Methods," IEEE Trans. Med. Imag., Vol. MI-44, pp. 1425 (Mar. 1985).

Depending on the scanning configuration employed to obtain the cone beam projection data, the data set in Radon space may be incomplete. While image reconstruction through inverse Radon transformation certainly can proceed, artifacts may be introduced, resulting in images which can be inadequate for medical diagnosis or part quality determination purposes.

Figure 1:
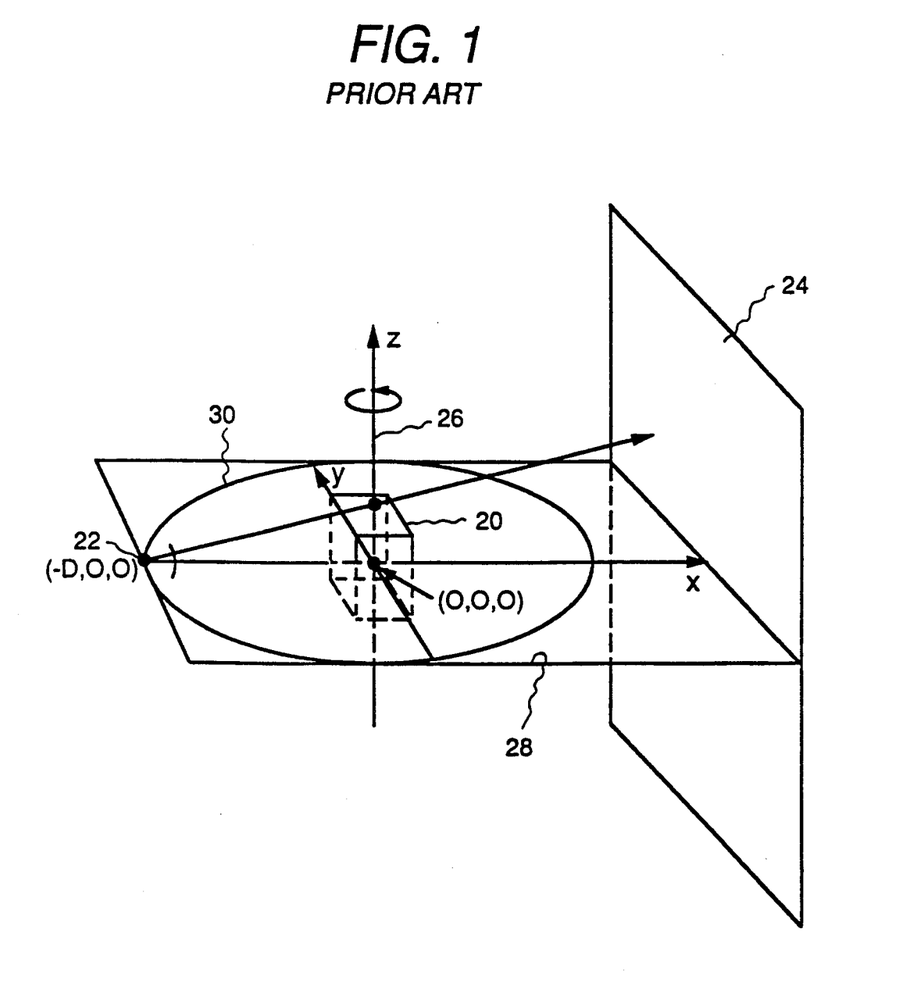
FIG. 1 referred to hereinabove, represents conventional cone beam scanning geometry for 3D CT.

A typical scanning and data acquisition configuration employing cone-beam geometry is depicted in FIG. 1. An object 20 is positioned within a field of view between a cone beam x-ray point source 22 and a 2D detector array 24, which provides cone beam projection data. An axis of rotation 26 passes through the field of view and object 20. For purposes of analysis, a midplane 28 is defined which contains the x-ray point source 22 and is perpendicular to the axis of rotation 26. By convention, the axis of rotation 26 is referred to as the z-axis, and the intersection of the axis of rotation 26 and the midplane 28 is taken as the origin of coordinates. x and y axes lie in the midplane 28 as indicated, and the (x,y,z) coordinate system rotates with the source 22 and detector 24. For scanning the object 20 at a plurality of angular positions, the source 22 moves relative to the object 20 and the field of view along a circular scanning trajectory 30 lying in the midplane 28, while the detector 24 remains fixed with respect to the source 22.

Thus, in the configuration of FIG. 1, data are acquired at a number of angular positions around the object by scanning the source and detector along the single circular scanning trajectory 30 (or equivalently rotating the object while the source and detector remain stationary). However, as demonstrated in the literature (e.g. Smith, 1985, above), and as described in greater detail hereinbelow, the data set collected in such a single scan is incomplete. As noted above, missing data in Radon space introduces artifacts during image reconstruction, resulting in images which can be inadequate for medical diagnosis or part quality determination purposes.

Smith (1985, above) has shown that a cone beam data set is complete if there is a point from the x-ray source scanning trajectory on each plane passing through the object of interest (with the assumptions that the detector is locked in position relative to the source and large enough to span the object under inspection). A configuration suggested by Minerbo (1979, above) and Tuy (1983, above), which Smith points out satisfies his condition for data completeness, is to employ two circular source scanning trajectories which are perpendicular to each other. Such a scanning configuration is however not always practical, as in the case of objects being very long in one dimension, such as a human body. Also, scanning in two perpendicular circles doubles the x-ray dosage to the object, which in some cases cannot be tolerated.

It may be noted that another scanning configuration which achieves data completeness is disclosed in commonly-assigned U.S. patent application Ser. No. 07/572,651, Filed Aug. 27, 1990, by Eberhard et al., and entitled "SQUARE WAVE CONE BEAM SCANNING TRAJECTORY FOR DATA COMPLETENESS IN THREE-DIMENSIONAL COMPUTERIZED TOMOGRAPHY." A scanning configuration which minimizes data incompleteness is disclosed in commonly-assigned U.S. patent application Ser. No. 07/572,590, filed Aug. 27, 1990, by Eberhard, and entitled "DUAL PARALLEL CONE BEAM CIRCULAR SCANNING TRAJECTORIES FOR REDUCED DATA INCOMPLETENESS IN THREE-DIMENSIONAL COMPUTERIZED TOMOGRAPHY." While effective to eliminate or reduce data set incompleteness, each of these approaches adds some complexity to the cone beam x-ray scanning configuration, for example by requiring motion in addition to rotation about the rotation axis, or by requiring additional x-ray sources and detectors. Additionally they increase the x-ray dose. Accordingly, the scanning geometry most commonly adopted is the circular scanning geometry depicted in FIG. 1.

In the context of the two general steps as stated above for image reconstruction by inversion from cone beam scanning data, it is relevant to note that the above-incorporated application Ser. No. 631,815 discloses efficient methods and apparatus for converting x-ray cone beam data to planar integrals, or values representing planar integrals, on a set of coaxial vertical planes in Radon space. The above-incorporated application Ser. No. 631,818 discloses a two-step approach for performing an inverse Radon transform starting with the planar integrals on the set of coaxial vertical planes. As Step 1 in the inverse Radon transform procedure, a 2D CT reconstruction procedure, such as filtered backprojection, is employed to calculate from the planar integrals a 2D projection image of the object on each of the planes. As Step 2, slices are defined in horizontal planes and the 3D image of the object is reconstructed slice-by-slice by employing for each slice a 2D CT reconstruction procedure, such as filtered backprojection, operating on the values of the 2D projection images in the plane of the slice to calculate a 2D image of the object for each slice.

SUMMARY OF THE INVENTION

Accordingly, it is an object of the invention to provide methods and apparatus for reconstructing a 3D image of an object from incomplete x-ray cone beam projection data.

It is a related object of the invention to provide methods and apparatus for reconstructing a 3D image of an object from x-ray cone beam projection data resulting from a single circular x-ray source scanning trajectory as an alternative to providing additional x-ray source scans to complete the data in Radon space.

In accordance with the invention, there are provide methods and apparatus for reconstructing a 3D image of an object from incomplete cone beam projection data, such as results from a single circular x-ray source scanning trajectory or multiple parallel circular source scanning trajectories. As a preliminary step, from the x-ray cone beam projection data, planar integrals are determined on a plurality of planes in Radon space containing a reference axis, for example a plurality of vertical planes, each containing a vertical axis. In apparatus embodying the invention, the values representing planar integrals may be determined by a suitable processor operating on the cone beam projection data.

In addition to the x-ray cone beam projection data, object boundary information is obtained for each of the plurality of planes containing the reference axis. Preferably, the object boundary information is obtained by employing an optical scanner comprising a point source of light, such as a laser, spaced a distance from the object sufficient to at least approximate a parallel beam; and a two-dimensional optical detector, such as an ordinary video camera. Thus, the object boundary information comprises a shadow of the object for each of the plurality of planes, without object density information.

Then, in accordance with the reconstruction technique disclosed in the above-incorporated application Ser. No. 631,818, on each of the planes containing the reference axis, a 2D CT reconstruction procedure, such as filtered backprojection, is employed to calculate a 2D projection image of the object on the particular plane. As explained in detail in the above-incorporated application Ser. No. 631,818, the image thus reconstructed on each of the coaxial planes in Radon space containing the reference axis is the projection of the three-dimensional object on the particular plane, in other words, what is usually referred to as the digital fluoroscopy (DF) or digital radiography (DR) image.

Next, an iterative procedure is employed to correct the 2D projection image on each of the planes in Radon space containing the reference axis employing, in addition to the 2D projection image, the object boundary information for the particular plane. In particular, the image is transformed back and forth between 2D projection image space and Radon space, correcting in 2D projection image space by a priori information on the object including the object boundary information for the particular plane, and correcting in Radon space by the planar integrals. Preferably, the 2D projection image on each of the planes in Radon space is transformed from projection image space to Radon space by reprojection, and is transformed from Radon space to projection image space by filtered backprojection.

Finally, as is also disclosed in the above-incorporated application Ser. No. 631,818, slices are defined in planes perpendicular to the reference axis, for example horizontal slices perpendicular to the vertical axis, and a 3D image of the object is reconstructed slice-by-slice by employing, for each slice, a 2D reconstruction procedure, for example, filtered backprojection, on the values of the 2D projection images in the plane of the slice to calculate a 2D image of the object for each of the slices.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Since the present invention is directed to reconstructing a 3D image of an object when the data set from the FIG. 1 cone beam scanning configuration is incomplete, what is meant by data set incompleteness will next be defined and described, followed by a description of methods and apparatus in accordance with the invention.

Data set completeness can be defined most clearly and rigorously in terms of the Radon transform approach to 3D imaging, represented in FIGS. 2a through 2f. Moreover, the present invention employs the Radon transform approach for actual reconstruction.

Figure 2A:
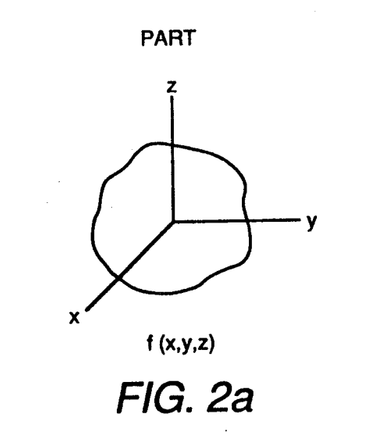
FIGS. 2a, 2b, 2c, 2d, 2e and 2f are diagrams depicting the Radon transform approach to 3D CT imaging.
Figure 2B:
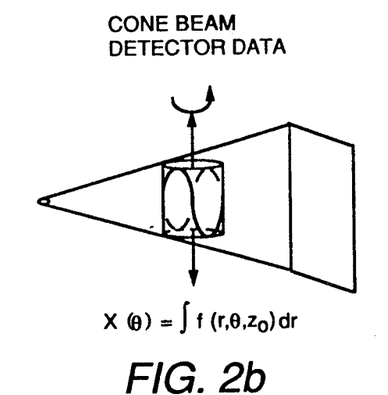
Figure 2C:
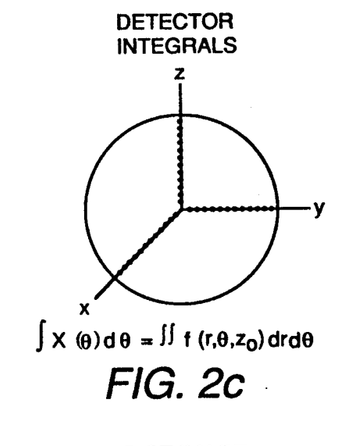
Figure 2D:
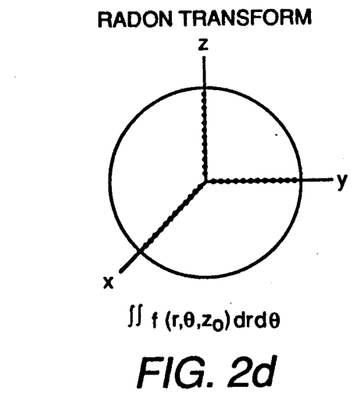
Figure 2E:
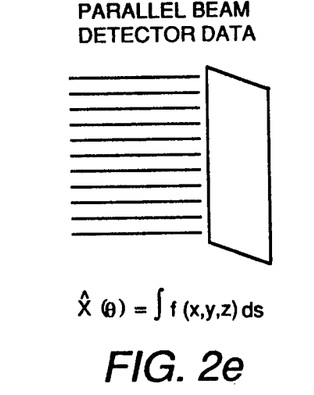
Figure 2F:
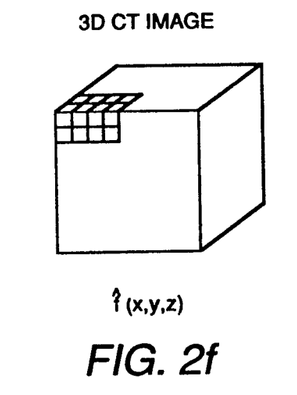

The object itself is defined in terms of its x-ray attenuation coefficient f(x,y,z) (FIG. 2a). The measured cone beam projection data then corresponds to a line integral of this function over the radial direction $X(\theta) = \int f(r,\theta,z_o)dr$ (FIG. 2b). The line integrals of the detector data (also known as detector integrals) are given by $\int X(\theta)d\theta = \int \int f(r,\theta,z_o)dr\, d\theta$ (FIG. 2c). In the parallel beam case, these detector integrals are simply equal to the Radon transform of the object. In the cone beam case, however, the Radon transform is given instead by $\int \int f(r,\theta,z_o) r\, dr\, d\theta$ (FIG. 2d). The additional factor of r in the Radon transform integral results from the Jacobian of the coordinate transformation from Cartesian to polar coordinates. As depicted in FIGS. 2e and 2f, an inverse Radon transform procedure reconstructs a 3D CT image from the detector integrals. Since direct inverse Radon transformation requires planar integrals of the object as input, a preliminary step of converting cone beam detector integrals to planar integrals may be employed.

It is significant to note that the data set is complete if it provides data at every point in Radon transform space; i.e., Radon space is filled with data over the region of support corresponding to the field of view in real space within which the object of interest fits.

Figure 3:
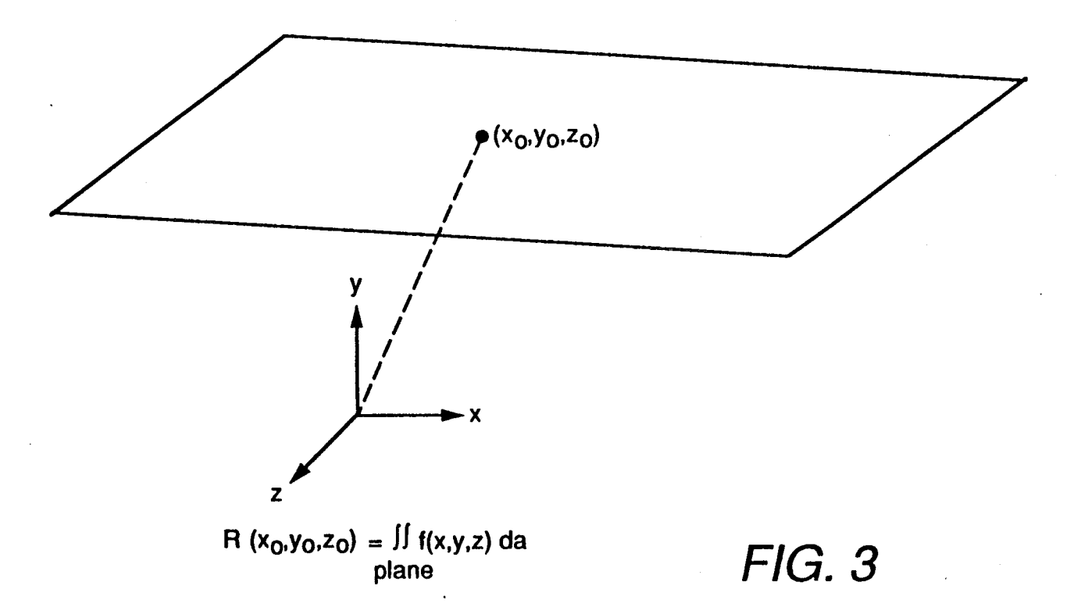
FIG. 3 is a representation of the 3D Radon transform of an object at a given point.

As depicted in FIG. 3, the 3D Radon transform of an object at a point $x_o,y_o,z_o$ is given by the area integral of the x-ray attenuation coefficient over the plane passing through $x_o,y_o,z_o$ that is perpendicular to the line from the origin to $x_o,y_o,z_o$, and can be expressed as $$R(x_o,y_o,z_o) = \iint_{plane} f(x,y,z)da \quad (1)$$

For a 2D radon transform, the situation is similar, except that the integral is over a line, not over a plane.

Figure 4A:
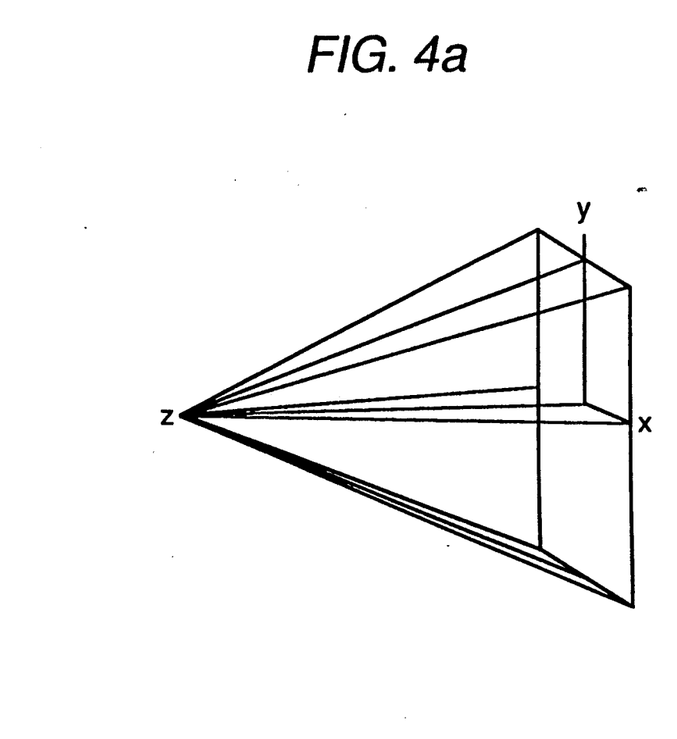
FIG. 4a and 4b depict Radon space filling in the case of 3D cone beam CT.
Figure 4B:
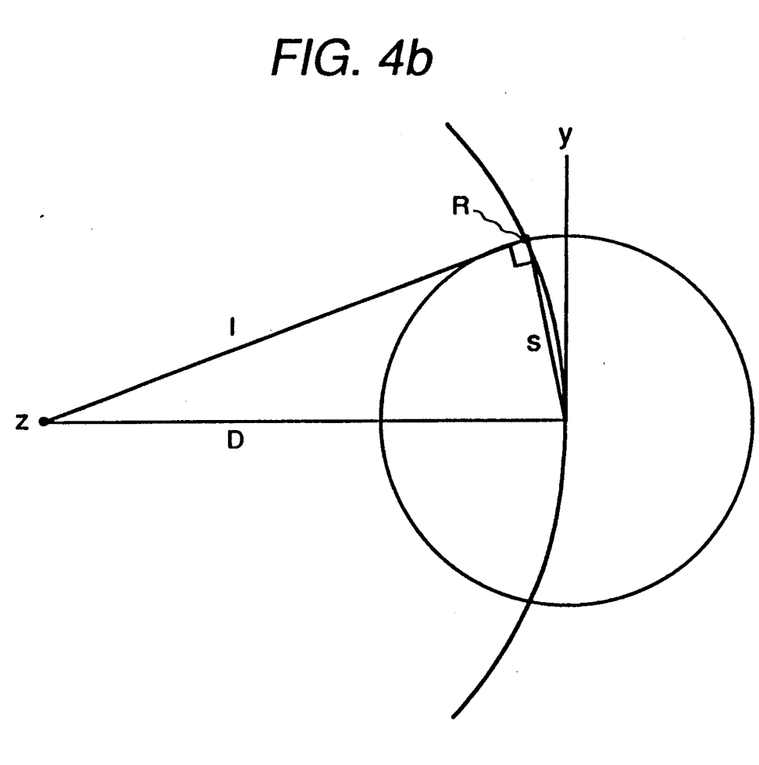
Figure 5:
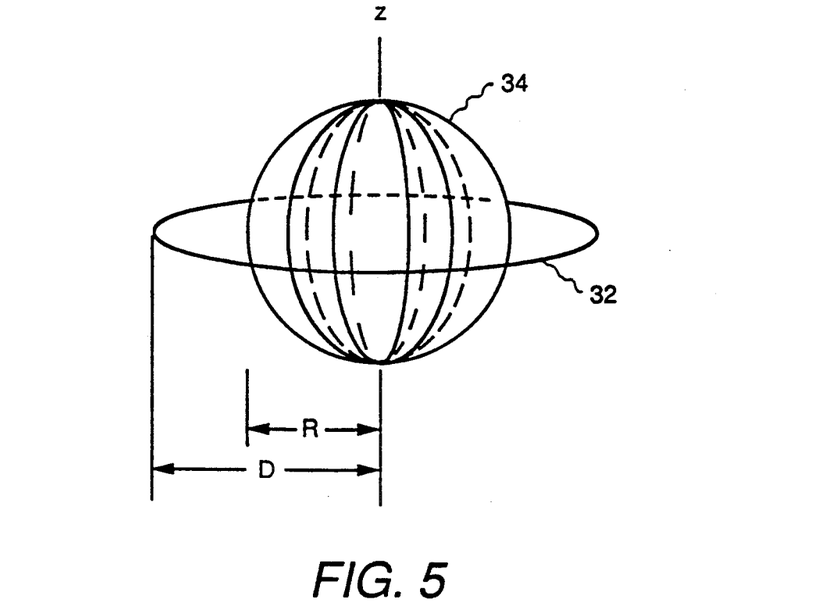
FIG. 5 depicts a circular scanning trajectory corresponding to FIG. 1.
Figure 6:
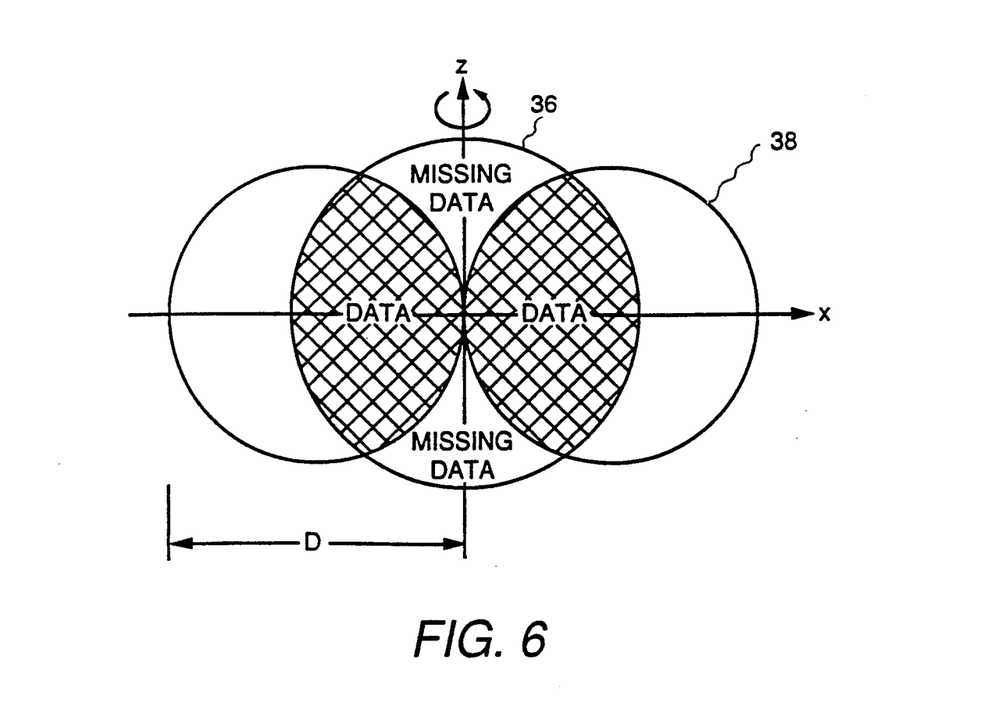
FIG. 6 depicts regions of available data and missing data in Radon space when the scanning configuration of FIGS. 1 and 5 is employed.

Any scanning and data acquisition configuration provides data over some volume of Radon space. The relevant cone beam case in 3D is represented in FIGS. 4a and 4b. Corresponding to FIGS. 4a and 4b are FIG. 1, described hereinabove; FIG. 5, which depicts a single circular source scanning trajectory 32 around a spherical field of view 34 of radius R within which an object to be scanned fits; and FIG. 6, which depicts in cross-section the intersection of a sphere 36 of equal radius in Radon space comprising the region of support for the spherical field of view 34 with a toric volume 38 representing the region in Radon space for which data are available. In FIG. 6, the diameter of each side of the toric volume 38 is equal to the source to axis of rotation distance D.

In FIGS. 4a and 4b, an exemplary point R shown in Radon space corresponds to the detector integral along the top line of the detector data. The points in Radon space for all detector line integrals at a single view angle correspond to a section of a sphere with diameter equal to the source to center of rotation distance. A new spherical shell of data is created at each view angle, and for a 360° scan, the available data falls inside the toric volume 38 (FIG. 6).

Thus, as represented in FIG. 6, in Radon space data for reconstruction are available at those points within the sphere 36 where the sphere intersects the toric volume 38, as indicated by the word "data." As indicated by the words "missing data," data are absent for points on the top and bottom of the Radon sphere 36 because these points correspond to planes parallel and near parallel to the x,y plane and data for these planes are not available because of the cone beam nature of the x-ray source. The region of missing data narrows as z approaches the midplane, and for z=0 (on the midplane), all the required data are available. If all the projection data for the object inside the sphere in Radon space is available, then the image of the object can be reconstructed uniquely. In accordance with the present invention, the missing projection data are filled in by an iterative procedure using object boundary information obtained in a separate optical scan.

The planar integral of Equation (1) above can also be expressed as $$R(s,\hat{n}) = \int d^3r \delta(s - r\cdot\hat{n}) f(r) \quad (2)$$

where $\hat{n} = (\sin\theta\cos\phi, \sin\theta\sin\phi, \cos\phi)$ is a direction vector characterizing the normal to the plane; s is the distance of the plane from the origin; and f(r) is the 3D object.

In words, R(s,n) represents the integrated density of the object on the plane whose normal is n and which is at a distance s from the origin. The planar integral R(s,n) is also referred to as Radon data.

The inverse Radon transformation by which a 3D object f(r) can be reconstructed from its planar integrals R can be expressed as $$f(r) = \frac{-1}{8\pi^2} \int\int\int d\phi d(\cos\theta) ds \frac{\partial^2}{\partial s^2} R(s,n)\delta(s - r \cdot n) \quad (3)$$

As disclosed in detail in the above-incorporated application Ser. No. 631,818, the inverse Radon transformation expressed in Equation (3) can be achieved through a two-step process. Step 1 comprises 2D CT image reconstructions on a number of vertical planes containing the z axis, described hereinbelow with reference to FIG. 7. Step 2 comprises 2D CT image reconstructions on a number of horizontal planes, described hereinbelow with reference to FIG. 11.

Figure 7:
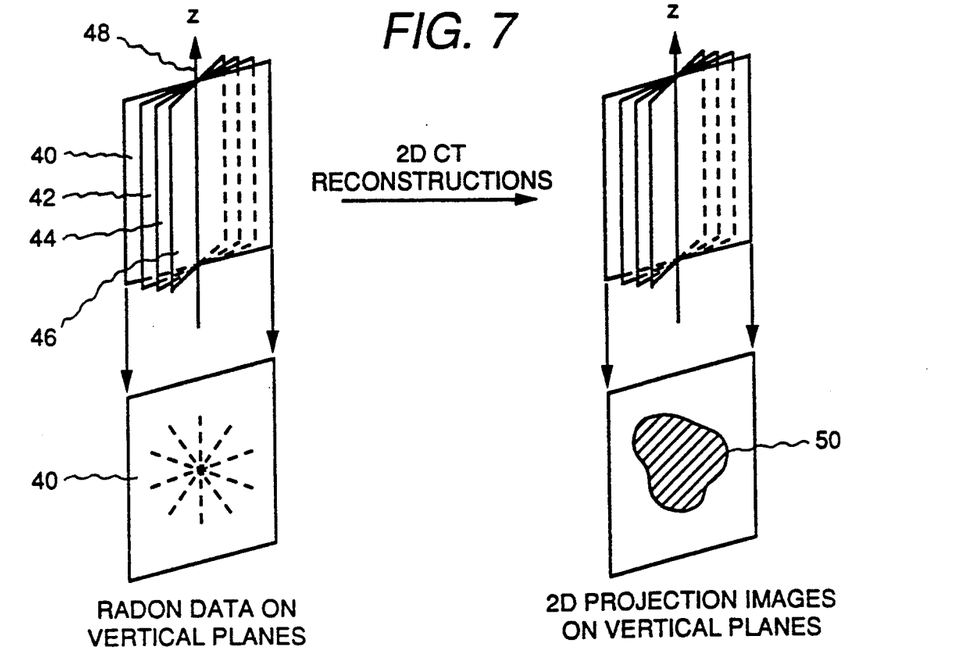
FIG. 7 depicts reconstruction of the 2D projection image on each of a plurality of coaxial vertical planes.

As a preliminary step depicted in FIG. 7, planar integrals are determined and organized on a plurality of planes containing a reference axis in Radon space, for example, on vertical planes 40, 42, 44 and 46 containing a vertical reference axis 48. As shown by Minerbo (1979, above), the data p(s,â), which represent the planar integrals of the object f(x,y,z) on planes perpendicular to the direction â, can be obtained from the cone beam scan data. The procedure comprises integrating the detector readings over straight lines on the detector plane. A preferred procedure however for determining the planar integrals is disclosed in the above-incorporated concurrently-filed application Ser. No. 631,815.

As a first subsequent step (Step 1), also depicted in FIG. 7, a 2D CT reconstruction procedure, such as but not limited to filtered backprojection, is employed to calculate a 2D projection image of the object, such as image 50, on each of the planes containing the reference axis 48, that is on each of the vertical planes such as the planes 40, 42, 44 and 46. In other words, the entire Radon data set is partitioned by the vertical planes containing the z-axis or reference axis 48, and the two-dimensional projection image on each of these vertical planes is reconstructed from the data set on each particular plane.

Figure 8:
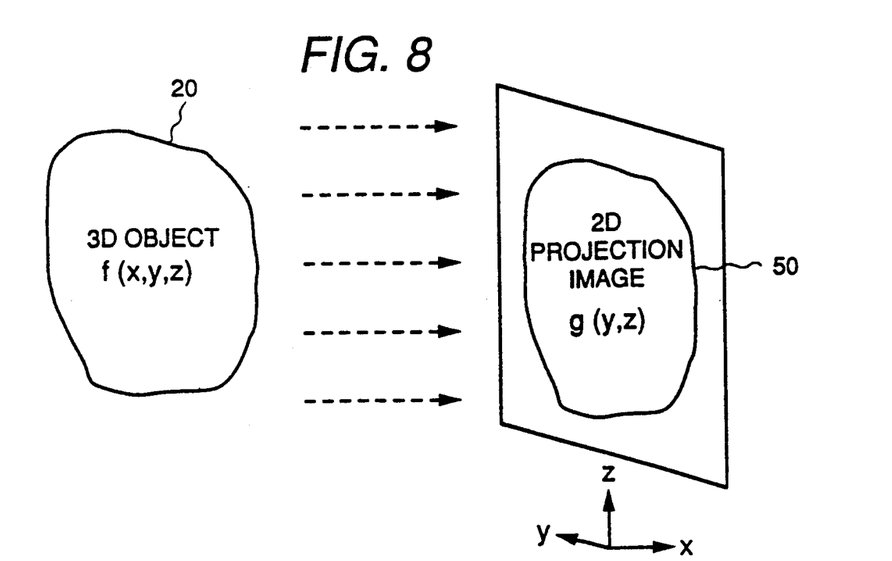
FIG. 8 is a representation of a 2D projection image of a 3D object on a single vertical plane.

FIG. 8 illustrates that the reconstructed images represent the 2D projection images of the 3D object onto the respective vertical planes. In other words, the plane integral projections of the 3D object on each vertical plane are the same as the line integral projections of the 2D projection image of the object onto the plane. Thus, performing a 2D image reconstruction from the data on the vertical plane yields the 2D Projection image. Viewed in this way, it will be appreciated that the missing information on each vertical plane can be treated as the missing line integral projection data of the corresponding 2D projection image.

In accordance with the invention, these missing projection data are recovered via an iterative procedure using a priori information on that projection image, where the iterative procedure is based on the analysis of K.C. Tam and V. Perez-Mendez, "Tomographical Imaging with Limited Angle Input," J. opt. Soc. Am., Vol. 71, No. 5, pp. 582–592 (May 1981).

Figure 9:
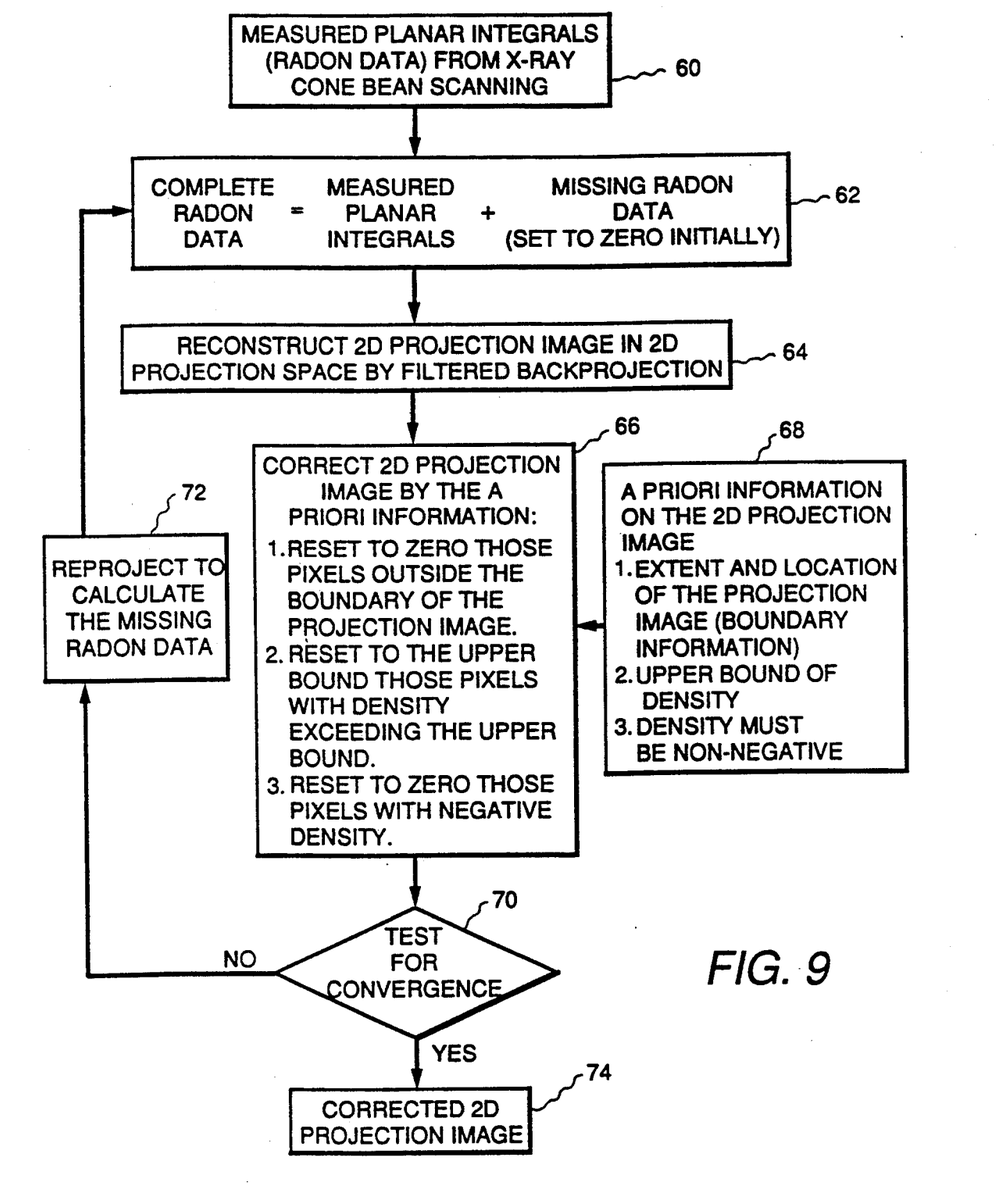
FIG. 9 is a flowchart of an iterative procedure for correcting the 2D projection image on each of the coaxial vertical planes.

More specifically, FIG. 9 depicts the iterative procedure whereby the 2D projection image on each of the coaxial planes in Radon space is corrected by transforming the image back and forth between 2D projection image space and Radon space, correcting in 2D projection image space by a priori information on the object including the object boundary information for the particular plane, and correcting in Radon space by the planar integrals.

Thus, the iterative procedure of FIG. 9 begins in Box 60 with measured planar integrals (Radon data), which are the planar integrals calculated from x-ray cone beam scanning. It will be appreciated that, although the planar integrals are not themselves directly measured, they are referred to herein as "measured" planar integrals because they are derived from actual measurements of x-ray attenuation data.

In Box 62, on each of the coaxial planes in Radon space the complete set of Radon data is formed from the measured planar integrals and the missing Radon data, as illustrated in FIG. 6. On the first pass through the iterative procedure of FIG. 9, the missing Radon data is set initially to zero such that the measured planar integrals from Box 60 in effect pass directly through Box 62.

Box 64 then depicts the step of reconstructing a 2D projection image in 2D projection space by filtered backprojection, corresponding to what has been identified as Step 1 hereinabove. This results in what may also be viewed as an initial estimate of the 2D projection image, which image is then corrected in Box 66 by the a priori information on the object. As indicated in Box 68, this a priori information on the object includes the extent and location of the object, that is, the object boundary information referred to hereinabove; the upper bound of the object density, which is known based on the particular material comprising the object; and the fact that the object density cannot be non-negative. Returning to Box 66, the 2D projection image of the object is corrected, pixel by pixel, by resetting to zero those pixels outside the known extent of the object based on the boundary information; resetting to the upper bound those pixels with density exceeding the upper bound; and resetting to zero those pixels with negative density.

A test for convergence is made in Box 70. Until the iterative procedure is completed, the results of the convergence test are "no," and accordingly in Box 72 the image is transformed from 2D projection image space back to Radon space by reprojection to calculate the missing Radon data.

The calculated missing Radon data from Box 72 is then input to the correction step of Box 62 to give an improved estimate of the complete set of Radon data.

The procedure thus continues until the test for convergence of Box 70 is "yes," whereupon the corrected 2D projection image is output as Box 74.

Figure 10:
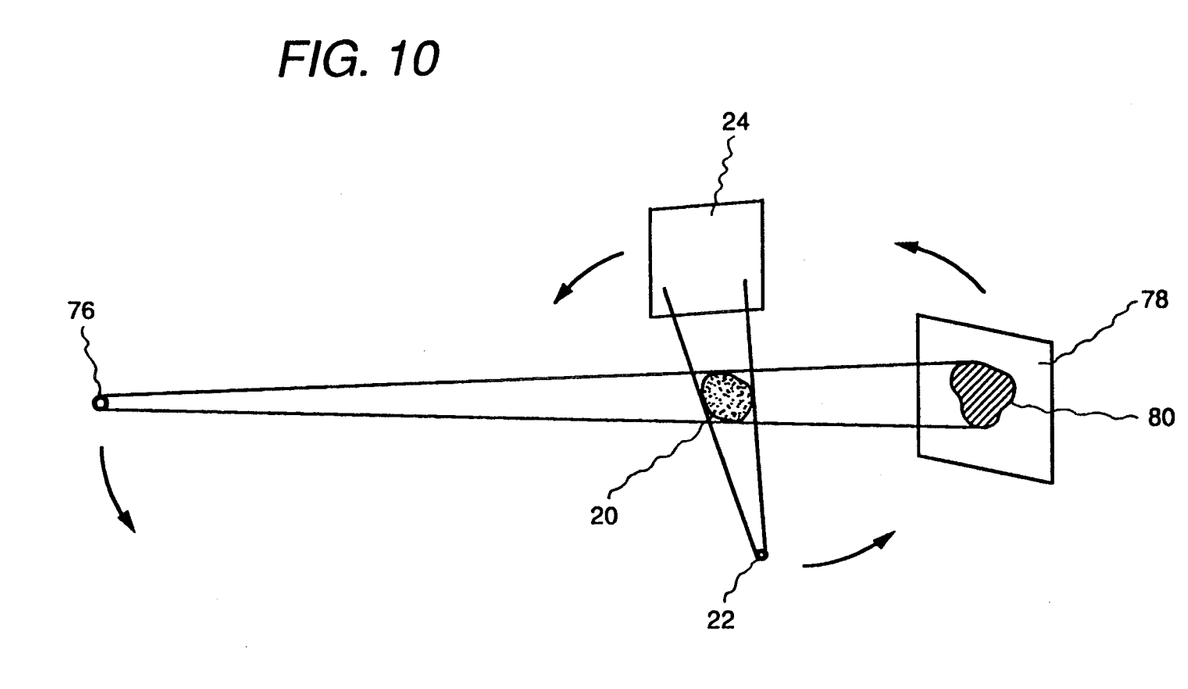
FIG. 10 depicts an optical scanning configuration for obtaining accurate boundary information for the 2D projection image on each vertical plane.

FIG. 10 depicts a scanning configuration whereby accurate boundary information for the projection image on each vertical plane is obtained as the a priori extent and location of the object in the iterative procedure. In FIG. 10, a distant laser point source 76 and an optical recorder 78 are employed to scan the object 20, with the shadow 80 of the object at each laser source position recorded by the optical recorder. The laser point source 76 is spaced from the object a distance sufficient to at least approximate a parallel beam. Any suitable optical recorder may be employed, such as a video camera. However, a very simple optical recorder may be employed, since only the shape of the shadow rather than its intensity is needed; therefore, the optical recorder does not require gray scale capability.

As noted above, the object shadow 80 is equivalent to the 2D projection image 50 of FIG. 8, except for the exact intensity values in the non-zero regions. Thus, the shadow 80 is basically a binary image, it is either zero or nonzero, and provides the boundary to be used as a priori information in the reconstruction of the projection image.

The boundary provided by the object shadow 80 in the laser scan is very exact, and both the interior as well as the exterior boundary of the projection image are available. If the projection image contains cavities, such as in the case of an industrial part, these cavities also show up in the recorded shadow. As a result, the iterative procedure works very efficiently in recovering the missing Radon data, i.e., to correct the 2D projection image on each of the vertical planes.

The optical scanning to obtain the object boundary information can be done at the same time as the x-ray cone beam scanning, and an x-ray point source 22 and a two-dimensional array detector 24 are accordingly also depicted in FIG. 10.

Although not presently preferred, it will be appreciated that other means for providing a parallel beam may be employed, such as mechanically scanning a pencil beam light source in front of the object.

Figure 11:
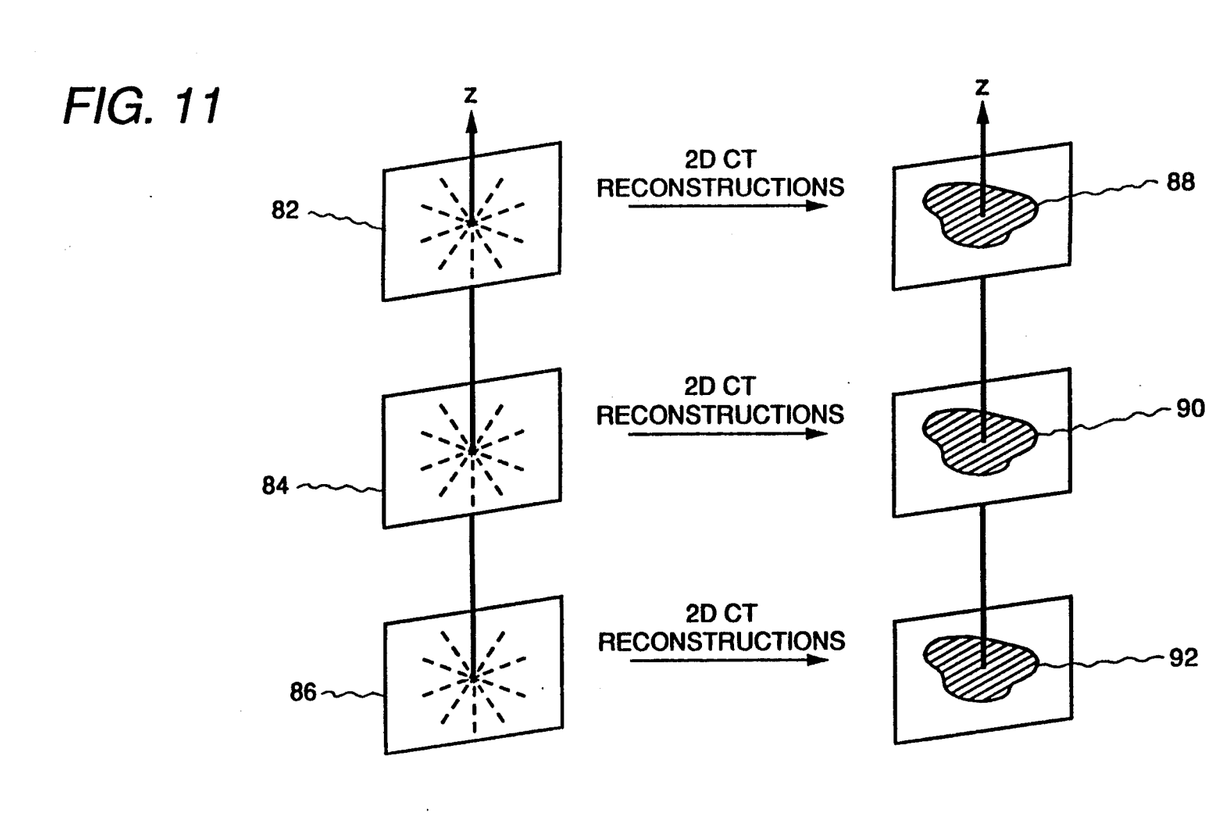
FIG. 11 depicts reconstruction of the object slice-by-slice on each horizontal plane.

As a second subsequent step (Step 2), depicted in FIG. 11, slices are defined in planes perpendicular to the reference axis 48, that is on horizontal planes such as planes 82, 84 and 86, and a 2D CT reconstruction procedure, such as filtered backprojection, is employed to calculate a 2D image of the object for each of the slices, operating on the values of the 2D projection image in the plane of the slice, such as images 88, 90 and 92. The slice images 88, 90 and 92 taken together comprise a slice-by-slice 3D image. The entire Step 2 procedure is described in greater detail in the above-incorporated application Ser. No. 631,818.

Figure 12:
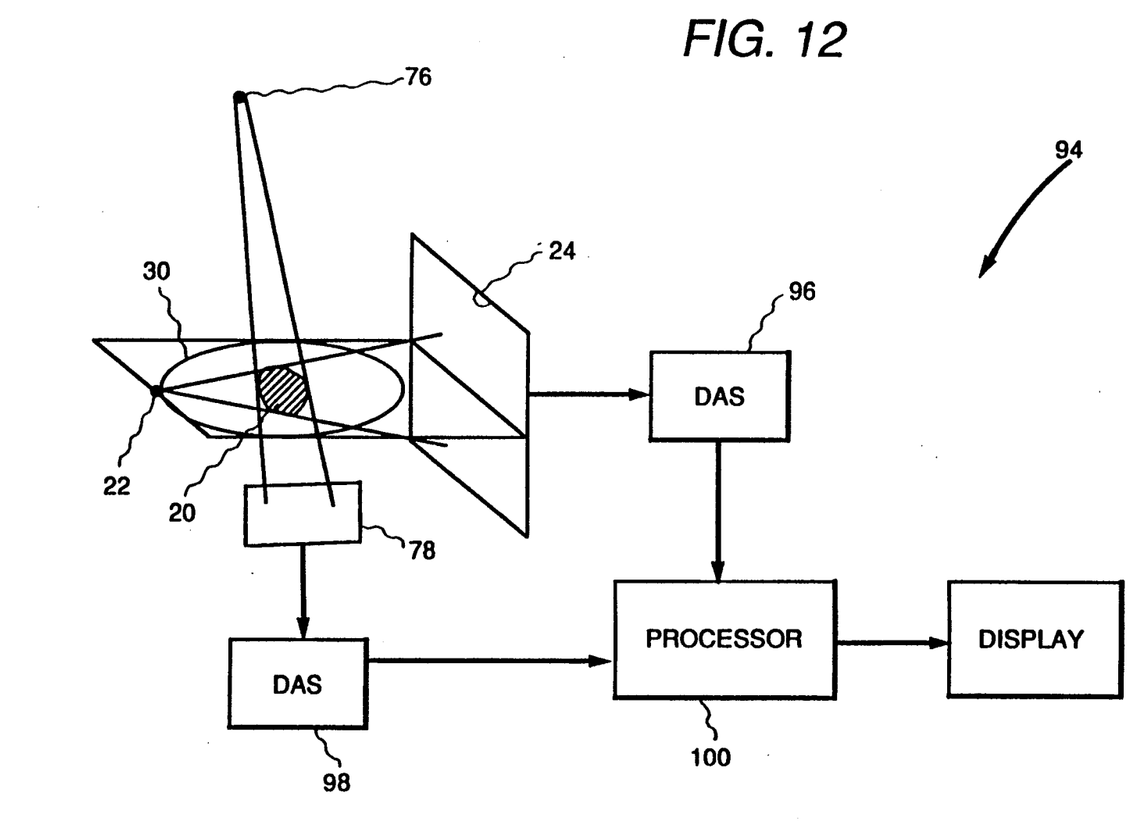
FIG. 12 is a block diagram of apparatus in accordance with the invention.

FIG. 12 depicts overall apparatus, generally designated 94, embodying the invention. The apparatus 94 includes a typical x-ray cone beam scanning configuration including x-ray point source 22 and detector array 24 as described hereinabove with reference to FIG. 1, a data acquisition system (DAS) 96 connected to the 2D x-ray detector 24; a laser source 76 and a 2D optical detector 78 for obtaining object boundary information, both as described hereinabove with reference to FIG. 10; and an optical data acquisition system (DAS) 98 connected to the optical array detector.

During operation, x-ray photons that penetrate the object are detected by x-ray detector array 24, and registered by the data acquisition system (DAS) 96. Photon counts, after being normalized by the air signals and converted to the negative of the logarithms, represent the line integrals through the object 20. Thus, data are acquired at a number of source positions around the object 20 by scanning the source 22 and detector 24 along the scanning trajectory 30 (or equivalently rotating the object 20 while the source 22 and detector 24 remain stationary).

In addition, either simultaneously with, prior to, or after the x-ray cone beam data is acquired, the object is scanned by means of the laser source and optical detector, and object boundary information is registered in the data acquisition system (DAS) 98 for each of the FIG. 7 vertical planes. Since the cone beam x-ray and the optical scans are positioned a representative 90° with respect to each other, it will be appreciated that the resultant x-ray and optical data sets are subsequently angularly aligned so that the resultant projection images correspond for each of the vertical planes.

The two data acquisition systems 96 and 98 are connected to a representative processor 100, which serves to reconstruct a 3D image of the object 20 by implementing the methods described hereinabove. Thus, the processor 100 includes means for computing planar integrals on a plurality of planes each containing a reference axis in Radon space from the x-ray cone beam projection data, and means for calculating a 2D projection image of the object on each of the plurality of planes by employing a 2D CT construction procedure applied to the planar integrals. Preferably, the representative processor 100 comprises a plurality of specialized 2D CT reconstruction processors operating in parallel, as is more particularly described in the above-incorporated application Ser. No. 631,818.

The representative processor 100 additionally includes means for iteratively correcting the 2D projection images on the various vertical planes in Radon space by transforming the image back and forth between 2D projection image space and Radon space, correcting in 2D projection image space by a priori information on the object including the optical boundary information for the particular plane as determined employing the laser point source and the optical detector, and correcting in Radon space by the planar integrals resulting from the x-ray cone beam scan.

Finally, the representative processor 100 includes means for organizing the corrected 2D projection images on each of the planes containing the reference axis in the slices in planes perpendicular to the reference axis, and for calculating a 2D image of the object for each of the slices, whereby the 2D images for the slices together represent the 3D image of the object. Again, as is described in greater detail in the above-incorporated application Ser. No. 631,818, this last means for calculating a 2D image of the object for each of the slices preferably comprises a plurality of specialized 2D CT reconstruction processors operating in parallel.

In view of the foregoing, it will be appreciated that the present invention enables missing data which occur in many cone beam scans to be filled, making it possible to reconstruct images of high quality without increasing the x-ray dosage and the scanning time, or complicating the scanning operation. The object boundary information acquired and utilized in accordance with the invention is relatively straightforward and inexpensive to obtain, in contrast to what is required to provide additional x-ray sources and detectors to actually provide a complete data set in Radon space.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method for reconstructing a 3D image of an object from incomplete cone beam projection data, said method comprising:
    determining values representing planar integrals on a plurality of planes containing a reference axis in Radon space from the cone beam projection data;

scanning the object to obtain object boundary information for each of the plurality of planes containing the reference axis;

on each of the planes in Radon space containing the reference axis, employing a 2D CT reconstruction procedure to calculate a 2D projection image of the object on the plane;

iteratively correcting the 2D projection image on each of the planes in Radon space containing the reference axis by transforming the image back and forth between 2D projection image space and Radon space, correcting in 2D projection image space by a priori information on the object including the object boundary information for the plane, and correcting in Radon space by the planar integrals; and defining slices in planes perpendicular to the reference axis and reconstructing the 3D image of the object slice-by-slice by employing for each slice a 2D CT reconstruction procedure on the corrected 2D projection images in the plane of each slice to calculate a 2D image of the object for each of the slices.

2. A method in accordance with claim 1, wherein said step of scanning to obtain object boundary information for each of the plurality of planes containing the reference axis comprises employing a source of light at least approximating a parallel beam and a two-dimensional optical detector.

3. A method in accordance with claim 2, wherein said step of employing a source of light at least approximating a parallel beam comprises employing a point source of light at a distance from the object sufficient to approximate a parallel beam.

4. A method in accordance with claim 1, wherein said step of iteratively correcting the 2D projection image on each of the planes in Radon space comprises transforming the 2D projection image from projection image space to Radon space by reprojection and transforming the 2D projection image from Radon space to projection image space by filtered backprojection.

5. A method in accordance with claim 1, wherein the 2D CT reconstruction procedure employed to calculate a 2D projection image of the object on the plane comprises filtered backprojection.

6. A method in accordance with claim 1, wherein the 2D CT reconstruction procedure employed to reconstruct each slice comprises filtered backprojection.

7. Apparatus for reconstructing a 3D image of an object from incomplete cone beam projection data, said apparatus comprising:

means for computing planar integrals on a plurality of planes containing a reference axis in Radon space from the cone beam projection data;

means for calculating a 2D projection image of the object on each of the plurality of planes containing the reference axis by employing a 2D CT reconstruction procedure applied to the planar integrals;

optical scanning means for obtaining object boundary information for each of the plurality of planes containing the reference axis;

means for iteratively correcting the 2D projection image on each of the planes in Radon space containing the reference axis by transforming the image back and forth between 2D projection image space and Radon space, correcting in 2D projection space by a priori information on the object including the object boundary information for the plane, and correcting in Radon space by the planar integrals; and means for organizing the corrected 2D projection images on each of the planes containing the reference axis into slices in planes perpendicular to the reference axis and for calculating a 2D image of the object for each of the slices;

whereby the 2D images for the slices together represent the 3D image of the object.

8. Apparatus in accordance with claim 7, wherein said optical scanning means comprises a point source of light at a distance from the object sufficient to approximate a parallel beam and a two-dimensional optical detector.

* * * * *